(12) United States Patent
Barker et al.

(10) Patent No.: US 10,322,947 B2
(45) Date of Patent: Jun. 18, 2019

(54) RADIATION SOURCE CLEANING SYSTEM AND MODULE CONTAINING SAME

(71) Applicant: Trojan Technologies, London (CA)

(72) Inventors: Jeffrey Thomas Barker, London (CA); Wesley From, London (CA); Ed Kambulow, London (CA)

(73) Assignee: TROJAN TECHNOLOGIES GROUP ULC, London, Ontario (CA)

( * ) Notice: Subject to any disclaimer, the term of this patent is extended or adjusted under 35 U.S.C. 154(b) by 573 days.

(21) Appl. No.: 14/379,864

(22) PCT Filed: Feb. 25, 2013

(86) PCT No.: PCT/CA2013/000171
§ 371 (c)(1),
(2) Date: Aug. 20, 2014

(87) PCT Pub. No.: WO2013/123590
PCT Pub. Date: Aug. 29, 2013

(65) Prior Publication Data
US 2015/0028224 A1    Jan. 29, 2015

Related U.S. Application Data

(60) Provisional application No. 61/634,074, filed on Feb. 23, 2012.

(51) Int. Cl.
*B08B 3/04* (2006.01)
*C02F 1/32* (2006.01)

(52) U.S. Cl.
CPC ............... *C02F 1/325* (2013.01); *B08B 3/04* (2013.01); *C02F 2201/003* (2013.01);
(Continued)

(58) Field of Classification Search
CPC ................................................. C02F 2201/324
See application file for complete search history.

(56) References Cited

U.S. PATENT DOCUMENTS

| 6,013,917 A | 1/2000 | Ishiyama |
| RE36,896 E | 10/2000 | Maarschalkerweerd |
(Continued)

FOREIGN PATENT DOCUMENTS

| CN | 201603723 U | 10/2010 |
| CN | 102311154 A | 1/2012 |
(Continued)

OTHER PUBLICATIONS

Extended European Search Report for European Patent Application No. 13 75 1612, dated Jul. 8, 2015.
(Continued)

*Primary Examiner* — Spencer E Bell

(57) ABSTRACT

There is described a cleaning system for a radiation source. The cleaning system comprises: (i) a cleaning chamber housing; (ii) a cleaning cartridge removably disposed in the cleaning chamber housing; and (iii) an endcap element removably coupled to the cleaning chamber housing. The cleaning cartridge comprises a first sealing element and a second sealing element, the first sealing element and the second sealing element configured to provide a substantially fluid tight seal with respect to an exterior surface of the radiation source. A radiation source module and a fluid treatment system comprising the radiation source module are also described.

17 Claims, 5 Drawing Sheets

(52) U.S. Cl.
CPC .. *C02F 2201/004* (2013.01); *C02F 2201/006* (2013.01); *C02F 2201/324* (2013.01); *C02F 2201/3225* (2013.01); *C02F 2201/3227* (2013.01)

(56) References Cited

U.S. PATENT DOCUMENTS

| | | | |
|---|---|---|---|
| 6,646,269 B1 * | 11/2003 | Traubenberg | C02F 1/325 250/431 |
| 6,863,078 B1 * | 3/2005 | Dall'Armi | B01J 19/123 134/122 R |
| 7,026,630 B2 | 4/2006 | Chen et al. | |

FOREIGN PATENT DOCUMENTS

| | | |
|---|---|---|
| DE | 10010127 A1 | 10/2001 |
| WO | 00/51943 A1 | 9/2000 |
| WO | 01/12560 A1 | 2/2001 |
| WO | 2012006772 A1 | 1/2012 |

OTHER PUBLICATIONS

International Search Report for International Application No. PCT/CA213/000171 dated Jun. 13, 2013.
Office Action for Canadian Patent Application No. 2,846,938 dated Apr. 12, 2017.
Office Action for European Patent Application No. 13751612.6 dated Dec. 11, 2017.
Office Action for European Patent Application No. 13751612.6 dated Mar. 24, 2017.

\* cited by examiner

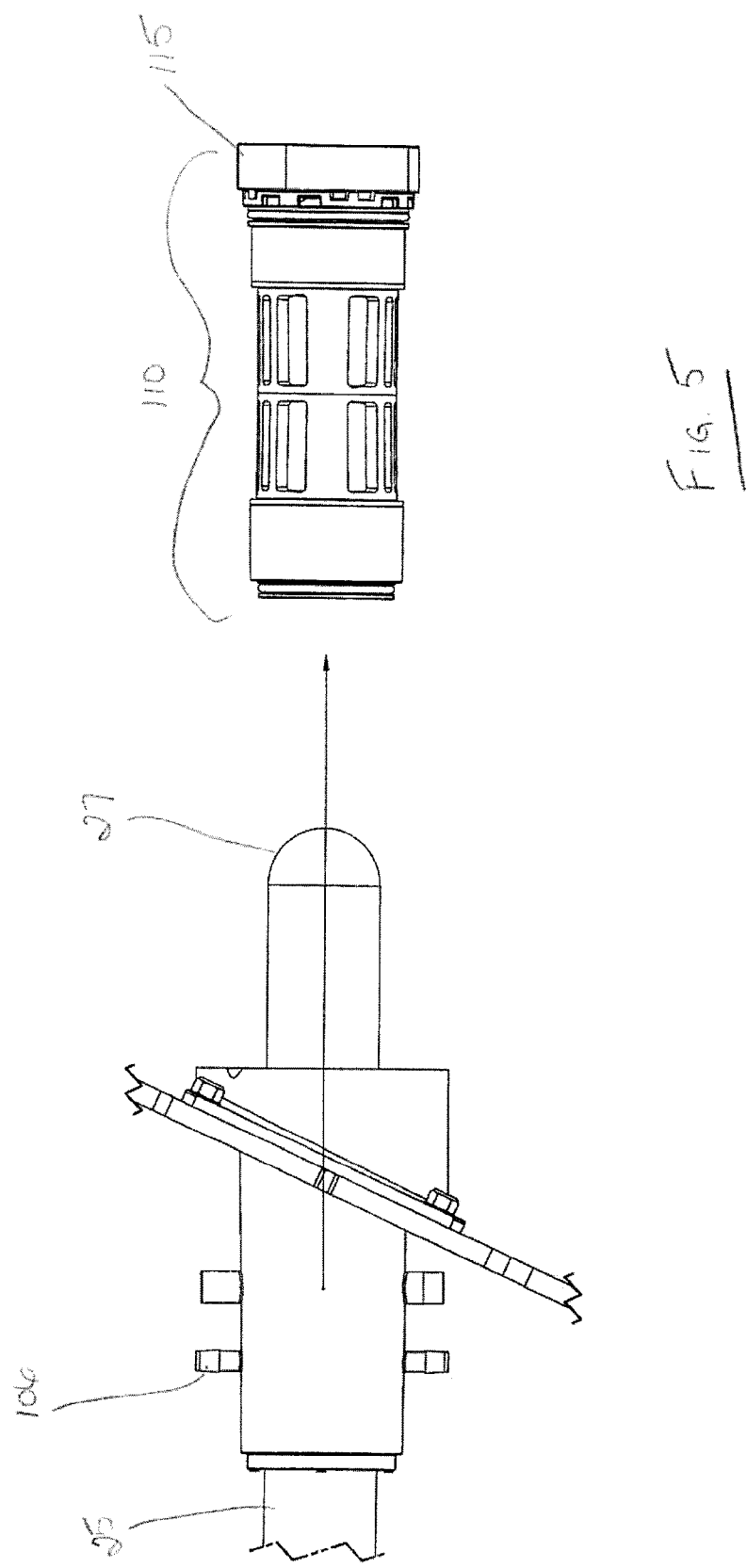

RADIATION SOURCE CLEANING SYSTEM AND MODULE CONTAINING SAME

CROSS-REFERENCE TO RELATED APPLICATION

The present application claims the benefit under 35 U.S.C. § 119(e) of provisional patent application Ser. No. 61/634,074, filed Feb. 23, 2012, the contents of which are hereby incorporated by reference.

BACKGROUND OF THE INVENTION

Field of the Invention

In one of its aspects the present invention relates to a radiation source cleaning system, particularly for use in a fluid treatment system. In another of its aspects, the present invention relates to a radiation source module containing the radiation source cleaning system fluid treatment system incorporating a radiation source module.

Description of the Prior Art

Fluid treatment systems are generally known in the art. More particularly, ultraviolet (UV) radiation fluid treatment systems are generally known in the art.

Early treatment systems comprised a fully enclosed chamber design containing one or more radiation (preferably UV) lamps. Certain problems existed with these earlier designs. These problems were manifested particularly when applied to large open flow treatment systems which are typical of larger scale municipal waste water or potable water treatment plants. Thus, these types of reactors had associated with them the following problems:

relatively high capital cost of reactor;
difficult accessibility to submerged reactor and/or wetted equipment (lamps, sleeve cleaners, etc);
difficulties associated with removal of fouling materials from fluid treatment equipment;
relatively low fluid disinfection efficiency, and/or
full redundancy of equipment was required for maintenance of wetted components (sleeves, lamps and the like).

The shortcomings in conventional closed reactors led to the development of the so-called "open channel" reactors.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents) all describe gravity fed fluid treatment systems which employ ultraviolet (UV) radiation.

Such systems include an array of UV lamp modules (e.g., frames) which include several UV lamps each of which are mounted within sleeves which extend between and are supported by a pair of legs which are attached to a crosspiece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the flow rate of the fluid past the lamps. Typically, one or more UV sensors may be employed to monitor the UV output of the lamps and the fluid level is typically controlled, to some extent, downstream of the treatment device by means of level gates or the like.

The Maarschalkerweerd #1 Patents teach fluid treatment systems which were characterized by improved ability to extract the equipment from a wetted or submerged state without the need for full equipment redundancy. These designs compartmentalized the lamp arrays into rows and/or columns and were characterized by having the top of the reactor open to provide free-surface flow of fluid in a "top open" channel.

The fluid treatment system taught in the Maarschalkerweerd #1 Patents is characterized by having a free-surface flow of fluid (typically the top fluid surface was not purposely controlled or constrained). Thus, the systems would typically follow the behaviour of open channel hydraulics. Since the design of the system inherently comprised a free-surface flow of fluid, there were constraints on the maximum flow each lamp or lamp array could handle before either one or other hydraulically adjoined arrays would be adversely affected by changes in water elevation. At higher flows or significant changes in the flow, the unrestrained or free-surface flow of fluid would be allowed to change the treatment volume and cross-sectional shape of the fluid flow, thereby rendering the reactor relatively ineffective. Provided that the power to each lamp in the array was relatively low, the subsequent fluid flow per lamp would be relatively low. The concept of a fully open channel fluid treatment system would suffice in these lower lamp power and subsequently lower hydraulically loaded treatment systems. The problem here was that, with less powerful lamps, a relatively large number of lamps was required to treat the same volume of fluid flow. Thus, the inherent cost of the system would be unduly large and/or not competitive with the additional features of automatic lamp sleeve cleaning and large fluid volume treatment systems.

This led to the so-called "semi-enclosed" fluid treatment systems.

U.S. Pat. Nos. 5,418,370, 5,539,210 and Re36,896 (all in the name of Maarschalkerweerd and all assigned to the assignee of the present invention and hereinafter referred to as the Maarschalkerweerd #2 Patents) all describe a cleaning system for use with a radiation source (e.g., a UV radiation source). The cleaning system is characterized by having a cleaning chamber on the exterior of the sleeve (e.g., quartz sleeve) of the radiation source (e.g., UV radiation source). The cleaning chamber is configured to receive a cleaning fluid and preferably comprised a sealing element (e.g., an O-ring) at opposed ends thereof. The cleaning system further comprised a motive element configured to move the cleaning chamber between a retracted position and an extended position with respect to the radiation source. The cleaning system described in the Maarschalkerweerd #2 Patents was a significant advance in the art. Specifically, it is believed that the cleaning system described in the Maarschalkerweerd #2 Patent was the first cleaning system for use with a radiation source that combined mechanical cleaning (via the sealing elements or O-rings in the cleaning chamber) with chemical cleaning (via the cleaning fluid in the cleaning chamber). This combined effect was found to be much better to remove fouling materials from the exterior of the radiation source compared to using mechanical cleaning alone (this was the conventional approach prior to the Maarschalkerweerd #2 Patents).

Despite the advance in the art made by the Maarschalkerweerd #2 Patents, there is room for improvement. Specifically, from time to time, it becomes necessary to service the cleaning system, more particularly to replace elements (e.g., O-ring, V-shaped seal and the like) which serve as seals and provide mechanical action to remove fouling materials from the radiation sources. In the cleaning system as described in the Maarschalkerweerd #2 Patents, it becomes necessary to dissemble the radiation source module containing the cleaning system, remove and replace the O-rings described therein and re-assemble everything again. This requires that the module be removed from service for a lengthy period of time requiring redundant equipment (and increased capital costs) or shutting the entire fluid treatment down (thereby negatively affecting the overall efficiency of the fluid treatment system).

Thus, it would be highly desirable to have a cleaning system which maintain the benefits of chemical and mechanical cleaning on the one hand but allow for relatively quick replacement of the sealing element (e.g., O-ring, V-shaped seal and the like). Preferably, this would be done: (i) without requiring removal of the entire cleaning system from the radiation source module, and/or (ii) relatively quickly so that the radiation source module could be returned to service without significant down time.

Thus, it would be highly desirable to have a cleaning system and radiation source module that overcomes the above problems.

SUMMARY OF THE INVENTION

It is an object of the present invention to obviate or mitigate at least one of the above-mentioned disadvantages of the prior art.

It is another object of the present invention to provide a novel cleaning system for a radiation source.

It is another object of the present invention to provide a novel radiation source module.

It is another object of the present invention to provide a novel fluid treatment system.

Accordingly, in one of its aspects, the present invention provides a cleaning system for a radiation source comprising:
  (i) a cleaning chamber housing;
  (ii) a cleaning cartridge removably disposed in the cleaning chamber housing, the cleaning cartridge comprising a first sealing element and a second sealing element, the first sealing element and the second sealing element configured to provide a substantially fluid tight seal with respect to an exterior surface of the radiation source; and
  (iii) an endcap element removably coupled to the cleaning chamber housing.

Thus, the present inventors have developed an improvement over the cleaning system described in the Maarschalkerweerd #2 Patents referred to above. More particularly, in the present cleaning system, it is possible to remove the inner components of the cleaning system which allows for quick replacement of the sealing element used to remove fouling materials from the exterior of the radiation source. Thus, the remaining components of the cleaning system may be left in place on the radiation source module. Additionally, replacement of the sealing element can be done very quickly thereby causing minimal disruption to the overall functioning of the fluid treatment system.

BRIEF DESCRIPTION OF THE DRAWINGS

Embodiments of the present invention will be described with reference to the accompanying drawings, wherein like reference numerals denote like parts, and in which:

FIG. 5 illustrates removal of inner components of the cleaning system for replacement of the sealing elements.

DETAILED DESCRIPTION OF THE PREFERRED EMBODIMENTS

Figure 1:
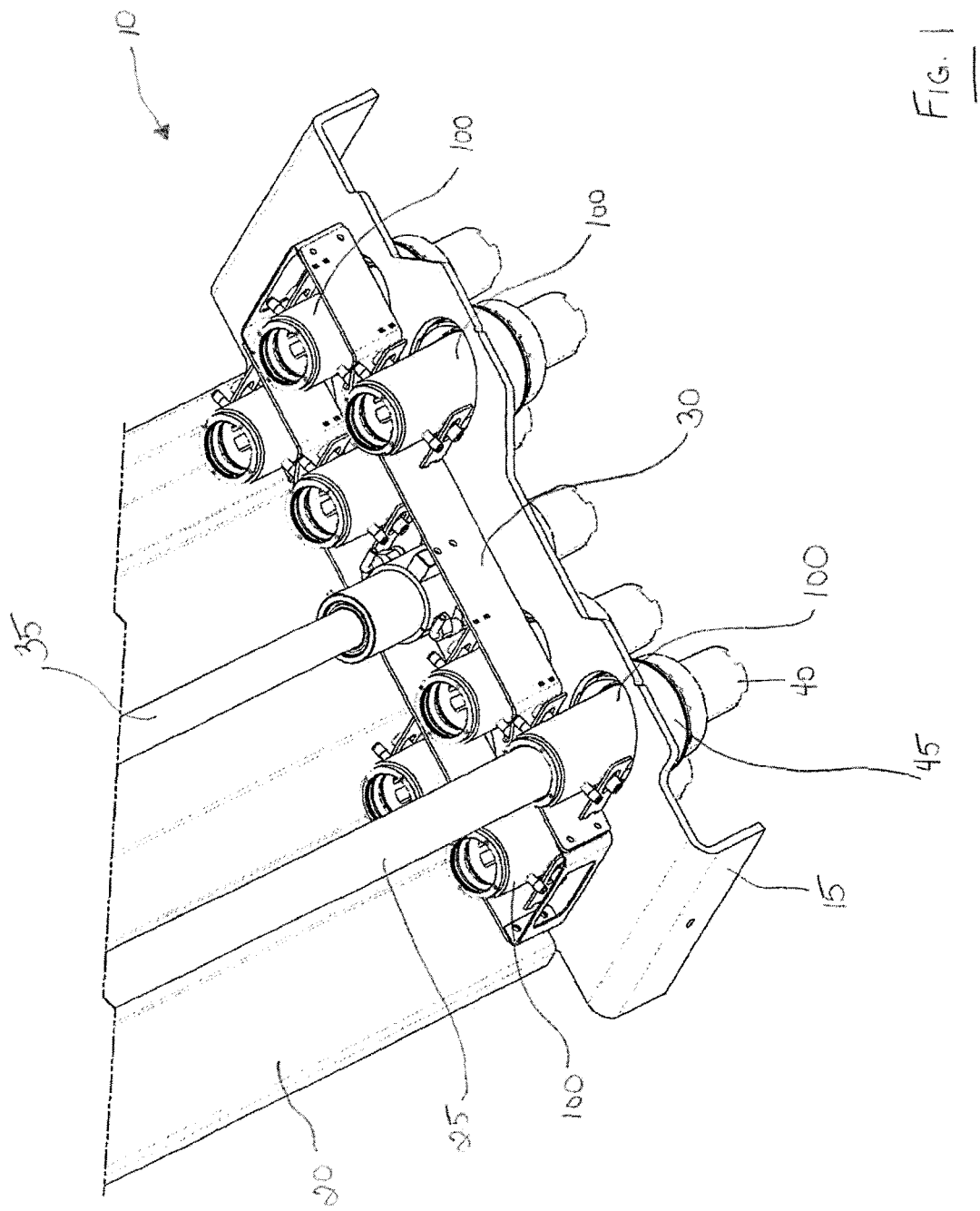
FIG. 1 illustrates a perspective view, partially cut away of a radiation source module incorporating a preferred embodiment of the present cleaning system.

In one of its aspects, the present invention relates to a cleaning system for a radiation source comprising:
  (i) a cleaning chamber housing;
  (ii) a cleaning cartridge removably disposed in the cleaning chamber housing, the cleaning cartridge comprising a first sealing element and a second sealing element, the first sealing element and the second sealing element configured to provide a substantially fluid tight seal with respect to an exterior surface of the radiation source; and
  (iii) an endcap element removably coupled to the cleaning chamber housing.

Preferred embodiments of this radiation source module may include any one or a combination of any two or more of any of the following features:
  the cleaning cartridge further comprises a first cap element coupled to the first sealing element;
  the cleaning cartridge further comprises a second cap element coupled to the second sealing element;
  the cleaning cartridge further comprises a first cap element coupled to the first sealing element, and a second cap element coupled to the second sealing element.
  the cleaning cartridge further comprises a spacer element configured to maintain the first cap element and the second cap element in a spaced relationship;
  the spacer element comprises a first end configured to couple with the first cap element;
  the first end of the spacer element and the first cap element are removably coupled;
  the first end of the spacer element and the first cap element are threadably coupled;
  the spacer element comprises a second end portion configured to couple with the second cap element;
  the second end of the spacer element and the second cap element are removably coupled;
  the second end of the spacer element and the second cap element are threadably coupled;
  the spacer element comprises a first end configured to couple with the first cap element and a second end portion configured to couple with the second cap element;
  the first end of the spacer element and the first cap element are removably coupled and the second end of the spacer element and the second cap element are removably coupled;
  the first end of the spacer element and the first cap element are threadably coupled and the second end of the spacer element and the second cap element are threadably coupled;
  the cleaning cartridge comprises a porous surface configured to permit cleaning fluid to contact a surface of the radiation source;
  the first cap element comprises a first spacer portion configured to maintain the first sealing element in a prescribed position with respect to the first cap element;

the second cap element comprises a second spacer portion configured to maintain the second sealing element in a prescribed position with respect to the second cap element;

(a) the first cap element comprises a first spacer portion configured to maintain the first sealing element in a prescribed position with respect to the first cap element, and (b) the second cap element comprises a second spacer portion configured to maintain the second sealing element in a prescribed position with respect to the second cap element;

the first cap element comprises a third sealing element configured to create a substantially fluid seal between the first cap element and a first interior portion of the cleaning chamber housing;

the third sealing element is annular;

the third sealing element is an O-ring;

the second cap element comprises a fourth sealing element configured to create a substantially fluid seal between the second cap element and a second interior portion of the cleaning chamber housing;

the fourth sealing element is annular.

the fourth sealing element is an O-ring.

the first sealing element is annular;

the first sealing element is a V-shaped seal;

the second sealing element is annular;

the second sealing element is a V-shaped seal;

the first sealing element and the second sealing element are directly coupled to a spacer element configured to maintain the first sealing element and the second sealing element in a spaced relationship;

the first sealing element and the second sealing element are directly removably coupled to a spacer element configured to maintain the first sealing element and the second sealing element in a spaced relationship;

the first sealing element and the second sealing element are directly permanently coupled to a spacer element configured to maintain the first sealing element and the second sealing element in a spaced relationship;

the cleaning cartridge comprises a porous surface configured to permit cleaning fluid to contact a surface of the radiation source;

the end cap element is threadably coupled to a first end portion of the cleaning chamber housing;

the end cap element comprises a second end portion configured to be releasably engagable with a third end portion on the second cap element;

the second end portion is configured to twist and lock the third end portion to allow removal of the cleaning cartridge from the cleaning chamber housing; and the cleaning chamber housing comprises a cleaning fluid inlet configured to permit cleaning fluid to be added to the cleaning chamber housing.

In another of its aspects, the present invention relates to a cleaning system module comprising a plurality of cleaning systems as described above for cleaning a plurality of radiation sources.

Preferred embodiments of this cleaning system module may include one or both of the following features:

the ratio of cleaning systems to radiation sources is 1:1; and the cleaning system module further comprises a motive element to move the cleaning system module between a retracted and an extended position with respect to the plurality of radiation sources.

In another of its aspects, the present invention relates to a radiation source module for use in a fluid treatment system, the radiation source module comprising at least one radiation source and the cleaning system described above.

In yet another of its aspects, the present invention relates to a radiation source module for use in a fluid treatment system, the radiation source module comprising a plurality of radiation sources and a plurality of cleaning systems as described above.

Preferred embodiments of this radiation source module may include one or both of the following features:

the ratio of cleaning systems to radiation sources is 1:1; and the radiation source module further comprises a motive element to move the cleaning system module between a retracted and an extended position with respect to the plurality of radiation sources.

In yet another of its aspects, the present invention relates to a fluid treatment system comprising a fluid treatment zone having disposed therein at least one radiation source module as described above.

Figure 2:
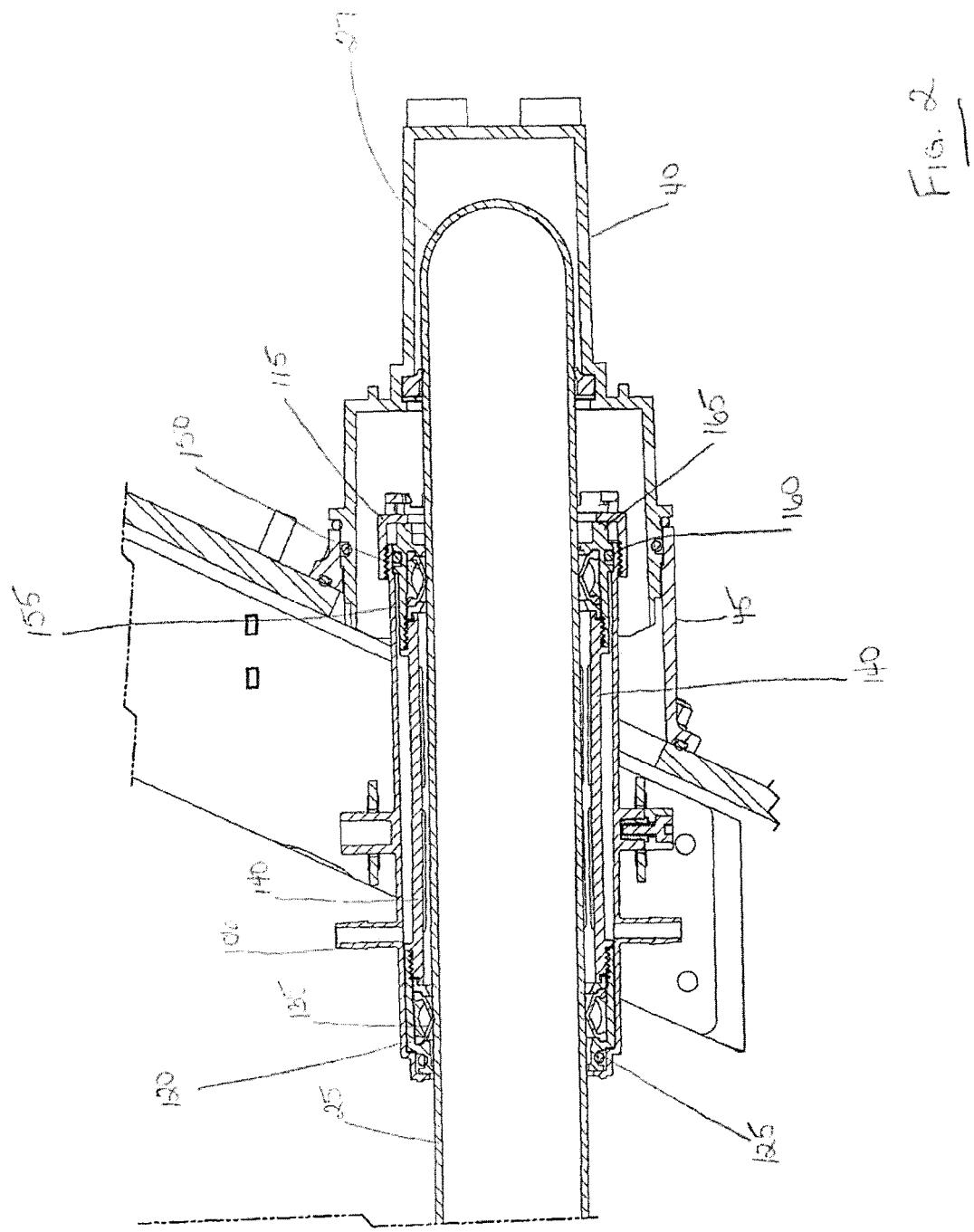
FIG. 2 illustrates a sectional view of a radiation source containing in the radiation source module of FIG. 1.

With reference to FIGS. 1 and 2, there is illustrated a partially cut away perspective view of a radiation source module 10. Radiation source module 10 comprises a bottom plate 15 and a sidewall 20 (an additional sidewall opposed to sidewall 20 is not shown for clarity).

Radiation source module 10 comprises a series of radiation sources 25, each radiation source 25 is in engagement with a cleaning system 100. It will be clear to those of skill in the art, that only one radiation source 25 is shown in FIG. 1 but it should be understood that a radiation source is used in conjunction with each of cleaning systems 100 shown in radiation source module 10 in FIG. 1.

Each cleaning system 100 is coupled to a yoke 30. Also coupled to yoke 30 is a drive mechanism 35 which is used to move yoke 30 between an extended position (shown in FIG. 1) and a retracted position (not shown).

A radiation sleeve support element 40 is coupled or connected to a receptacle 45 for receiving the distal portion of each radiation source 25.

Additional details on radiation source module 10 may be found in, for example, U.S. provisional patent application Ser. No. 61/457,048 and International Patent Application S.N. PCT/CA2011/001350.

With particular reference to FIG. 2, it can been seen that sleeve support element 40 is configured to receive and secure the closed end 27 of radiation source 25.

The various components of cleaning system 100 will now be described with particular reference to FIG. 3.

Generally, cleaning system 100 comprises a cleaning chamber housing 105, a cleaning cartridge 110 and an endcap element 115. In normal use, cleaning cartridge 110 is disposed within cleaning chamber housing 105 and secured in position by endcap element 115.

Cleaning cartridge 110 comprises a top cap 120 having an O-ring 125 at one end thereof. O-ring 125 forms a substantially fluid tight seal with cleaning chamber housing 105 when cleaning cartridge 110 is in use.

Cleaning cartridge 110 further comprises a first spacer element 130 having a wiper seal 135 in the form of an annular V-shaped seal coupled thereto via a friction fit—see, in particular FIG. 2 for a depiction of the V-shaped seal (those of skill in the art will recognize that "V-shaped" is in reference to the generally cross-section of the seal as shown in FIG. 2). Preferably, a tensioning spring (not shown for clarity) is provided to tension wiper seal 135 toward radiation source 25. The use of such a tensioning spring serves to minimize leaking of cleaning fluid from cleaning chamber housing 105, for example, due to small variations in the diameter of radiation source 25.

Next, wiper cartridge 110 comprises a scroll ring 140 having an open end to receive first spacer element 130. In use wiper seal 135 functions as a mechanical wiper in cleaning system 100.

Top cap 120 may be coupled to the end portion of scroll ring 140 by the threaded engagement as illustrated.

Wiper cartridge 110 further comprises a second spacer element 145 having a wiper seal 150 coupled thereto via a friction fit—wiper seal 150 is similar to wiper seal 135 described above. Again, as with wiper seal 135, a tensioning spring (not show for clarity) can be used with wiper seal 150. In use, wiper seal 150 functions as a mechanical wiper in cleaning system 100.

Cleaning cartridge 110 further comprises a bottom cap 155 having an O-ring 160 at one end thereof. In use O-ring 160 forms a substantially fluid tight seal with an interior portion of cleaning chamber housing 105. Cleaning chamber housing 105 further comprises an inlet port 106 for dispensing cleaning fluid and a pressure relief valve 107.

Bottom cap 155 and the opposed end of scroll cage 140 may be coupled by a threaded engagement as was described above for top cap 120 and the other end of scroll cage 140.

When cleaning cartridge 110 is fully assembled, it may be disposed in cleaning chamber housing 105. In this configuration, it will be understood that bottom cap 155 has a series of lugs 165 whose function will be described below.

Endcap element 115 has a series of lugs 170 which are reversibly engageable with lugs 165 on bottom cap 155. Endcap 115 may then be threadably coupled to the end portion of cleaning chamber housing 105 using the threaded portions shown in FIG. 3.

It will be appreciated by those of skill in the art that a substantially fluid tight cleaning chamber is created by the combination of cleaning chamber housing 105, O-rings 125,160, wiper seals 135,150 and the presence of radiation source 25. Further, it will be understood that cleaning fluid may be added to cleaning chamber housing 105 through inlet 106 and will contact radiation sleeve 25 (not shown in FIG. 3 for clarity) via the apertures in scroll cage 140.

The steps in servicing wiper seals 135,150 will now be described with reference to FIGS. 4 and 5.

Figure 4:
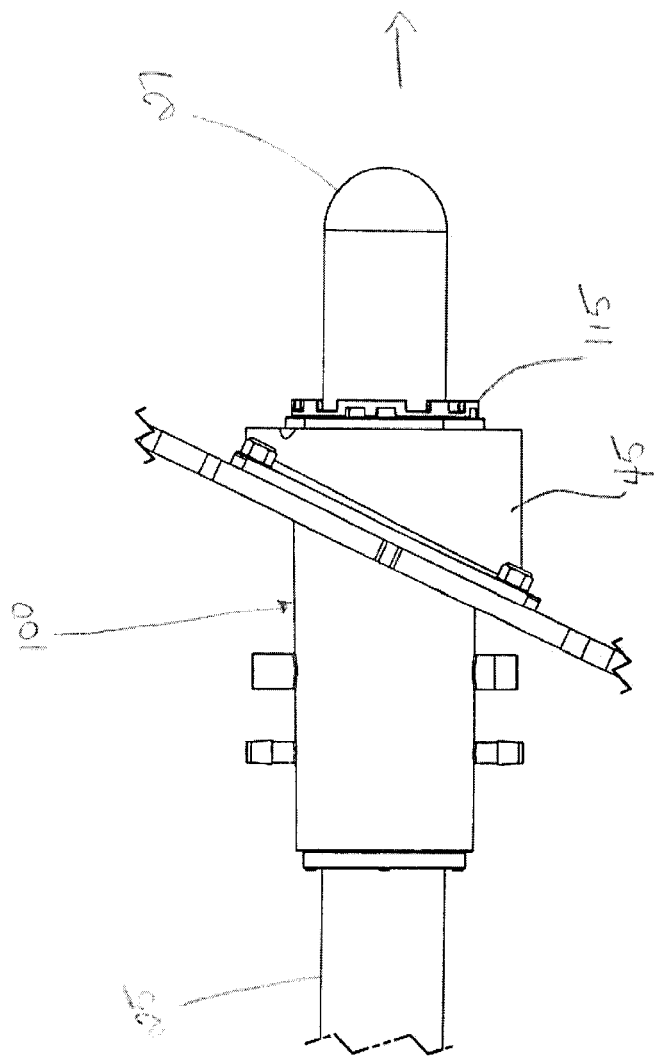
FIG. 4 illustrates removal an end portion of the radiation source module to gain access to the cleaning system.

Thus, when it is desired to service wiper seals 135,150, yoke 30 is moved to the extended position with respect to radiation sources 25—see FIG. 4 which illustrates a cleaning system 100 in the extended position with respect to radiation source 25.

Next, sleeve support element 40 is untwisted and removed from receptacle 45. This exposes the distal most portion of endcap element 115. Endcap element 115 is then unscrewed from cleaning chamber housing 105 to expose lugs 165 of bottom cap 155 of cleaning cartridge 110. Endcap element 115 is reversed so that lugs 170 may then be engaged with lugs 165 of bottom cap 155. This allows for withdrawal of the entire wiper cartridge 110—see FIG. 5.

Figure 3:
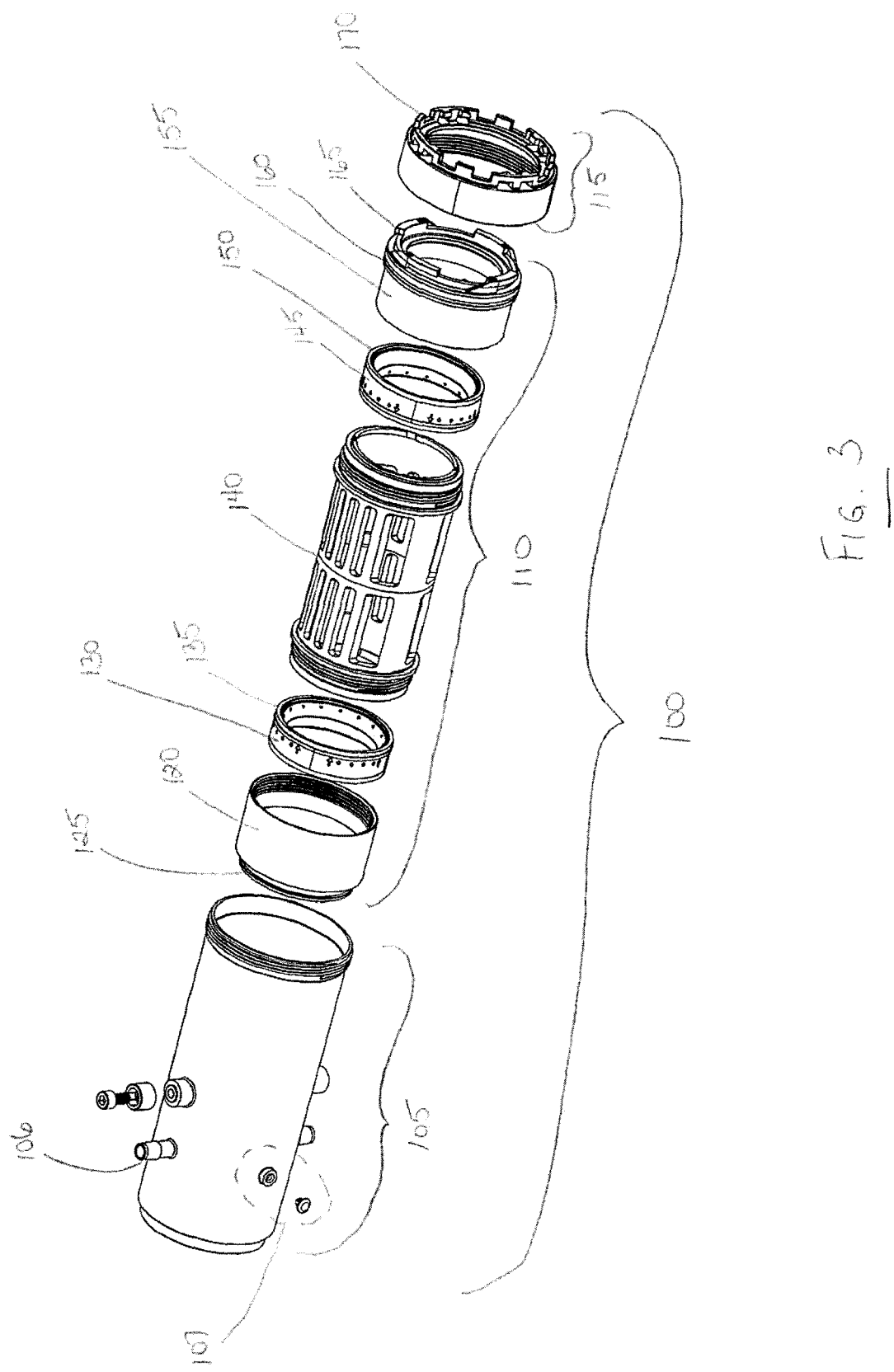
FIG. 3 illustrates an exploded view of the various components of the cleaning system illustrated in the radiation source module shown in FIGS. 1 and 2.

At this point, wiper cartridge 110 may be disassembled as described above with discussion of the elements of wiper cartridge 110 in FIG. 3. Wiper seals 135,150 may be replaced and the entire unit reassembled. The reassembled cleaning cartridge 110 may then be installed in cleaning chamber housing 105 by reversing the above steps.

Advantageously, the entire operation of replacing wiper seals 135,150 may be done in a matter of minutes for an entire module. It is particularly noteworthy that the replacement of wiper seals 135,150 can be done without disassembling the entire cleaning system from the radiation source module. This is a particular advantage of the present cleaning system.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, while the preferred form of wiper seals 135,150 is the V-shaped seal shown in FIG. 2, it should be recognized that it is possible to use other types of seals such as an O-ring and the like. In addition, while the illustrated embodiment of the present cleaning system includes a cleaning cartridge having removable caps, spacer elements (each including a wiper seal) and a scroll ring, this is merely the currently preferred embodiment. For, example it is possible for the cleaning cartridge to substantially integral. One embodiment of this alternative would be to modify the scroll ring to have suitable grooves (or other holding elements) for each of the wiper seals. Once the cleaning cartridge is withdrawn from the cleaning chamber housing, the wiper seals could be replaced and the cleaning cartridge could be re-used. Another embodiment of this alternative would be to modify the scroll ring to have the wiper seals permanently coupled thereto. Once the cleaning cartridge is withdrawn from the cleaning chamber housing, it would be discarded and replaced with a new cleaning cartridge with having wiper seals permanently coupled thereto. In both of these alternate embodiments, the top cap 120 and bottom cap 155 would be omitted. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A cleaning system for a radiation source in a fluid treatment system comprising:
   (i) a cleaning chamber housing coupled to the radiation source, wherein the cleaning chamber housing has a plurality of ports for fluid passage;
   (ii) a cleaning cartridge removably disposed in the cleaning chamber housing while the radiation source remains in the fluid treatment system and the cleaning chamber housing remains coupled to the radiation source, the cleaning cartridge comprising a first sealing element and a second sealing element, the first sealing element and the second sealing element configured to provide a substantially fluid tight seal with respect to an exterior surface of the radiation source; and
   (iii) an endcap element removably coupled to the cleaning chamber housing while the radiation source remains in the fluid treatment system and the cleaning chamber housing and at least one of the plurality of ports remain coupled to the radiation source, wherein the cleaning cartridge is removable from the cleaning chamber housing through an opening provided after removal of the endcap element.

2. The cleaning system defined in claim 1, wherein the cleaning cartridge further comprises a first cap element coupled to the first sealing element, and a second cap element coupled to the second sealing element.

3. The cleaning system defined in claim 2, wherein the cleaning cartridge further comprises a spacer element configured to maintain the first cap element and the second cap element in a spaced relationship.

4. The cleaning system defined in claim 3, wherein the spacer element comprises a first end configured to couple with the first cap element and a second end portion configured to couple with the second cap element.

5. The cleaning system defined in claim 4, wherein the first end of the spacer element and the first cap element are removably coupled and the second end of the spacer element and the second cap element are removably coupled.

6. The cleaning system defined in claim 2, wherein the endcap element comprises an end portion configured to be releasably engagable with an end portion of the second cap element.

7. The cleaning system defined in claim 6, wherein an end portion of the endcap is configured to twist and lock an end portion of the second cap element to allow removal of the cleaning cartridge from the cleaning chamber housing.

8. The cleaning system defined in claim 1, wherein the cleaning cartridge comprises a porous surface configured to permit cleaning fluid to contact a surface of the radiation source.

9. The cleaning system defined in claim 1, wherein: (a) a first cap element is coupled to the first sealing element, the first cap element comprising a first spacer portion configured to maintain the first sealing element in a prescribed position with respect to the first cap element, and (b) a second cap element coupled to the second sealing element, the second cap element comprising a second spacer portion configured to maintain the second sealing element in a prescribed position with respect to the second cap element.

10. The cleaning system defined in claim 1, wherein a first cap element is coupled to the first sealing element, the first cap element further comprising a first cap sealing element configured to create a substantially fluid seal between the first cap element and a first interior portion of the cleaning chamber housing.

11. The cleaning system defined in claim 10, wherein the first cap sealing element is annular.

12. The cleaning system defined in claim 1, wherein a second cap element is coupled to the second sealing element, the second cap element further comprising a second cap sealing element configured to create a substantially fluid seal between the second cap element and a second interior portion of the cleaning chamber housing.

13. The cleaning system defined in claim 12, wherein the second cap sealing element is annular.

14. The cleaning system defined in claim 1, wherein the first sealing element is annular.

15. The cleaning system defined in claim 1, wherein the second sealing element is annular.

16. The cleaning system defined in claim 1, wherein the first sealing element and the second sealing element are directly removably coupled to a spacer element configured to maintain the first sealing element and the second sealing element in a spaced relationship.

17. The cleaning system defined in claim 1, wherein the cleaning chamber housing comprises a cleaning fluid inlet configured to permit cleaning fluid to be added to the cleaning chamber housing.

* * * * *